US011206757B2

(12) United States Patent
de Bruin et al.

(10) Patent No.: US 11,206,757 B2
(45) Date of Patent: Dec. 28, 2021

(54) METHOD OF PROCESSING SEEDS AND SYSTEM FOR DETERMINING ANGLE OF REPOSE OF GRANULAR MATERIAL USED IN SEED PROCESS

(71) Applicant: Monsanto Technology LLC, St. Louis, MO (US)

(72) Inventors: Leendert de Bruin, Berkel en Rodenrijs (NL); Louis M. Pompe van Meerdervoort, Rotterdam (NL)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 16/505,354

(22) Filed: Jul. 8, 2019

(65) Prior Publication Data

US 2020/0015409 A1    Jan. 16, 2020

Related U.S. Application Data

(60) Provisional application No. 62/696,134, filed on Jul. 10, 2018.

(51) Int. Cl.
*A01C 1/00* (2006.01)
*G01B 11/26* (2006.01)
(Continued)

(52) U.S. Cl.
CPC .................. *A01C 1/00* (2013.01); *B02B 3/00* (2013.01); *G01B 11/26* (2013.01); *G06T 7/0004* (2013.01);
(Continued)

(58) Field of Classification Search
CPC .. G01N 15/147; G01N 15/1475; H04N 5/232; H04N 5/23203; G06T 7/70;
(Continued)

(56) References Cited

U.S. PATENT DOCUMENTS 5,846,591 A     12/1998   Satake et al.
6,471,096 B1 *  10/2002   Dave ...................... B65D 88/64
                                                              222/196
(Continued)

FOREIGN PATENT DOCUMENTS

JP        2636126 B2    7/1997
JP        1820779 B2    11/2011

OTHER PUBLICATIONS

Rietz, F, et al. Convection and Segregation In A Flat Rotating Sandbox. New Journal of Physics. Jan. 6, 2012, vol. 14. DOI: 10.1088/1367-2630/14/1/015001; p. 4, Third Paragraph; p. 8, Section 3.4, First Paragraph; p. 17, First Paragraph; p. 19, Figure 13 (d); Figure 13—caption.
(Continued)

*Primary Examiner* — Neil R Mikeska
(74) *Attorney, Agent, or Firm* — Stinson LLP

(57) ABSTRACT

In a method of processing seeds, an angle of repose of processed seeds is determined to evaluate whether the processed seeds have been sufficiently processed in a processing step. In a system for determining an angle of repose of processed seeds, a receptacle receives and supports the seeds in a pile. An image sensor faces the receptacle to capture an image of the pile of processed seeds in the cavity. An image processor is operatively connected to the image sensor to receive the captured image from the image sensor. The image evaluates the image to determine an angle of inclination of the pile based on the image.

20 Claims, 11 Drawing Sheets

(51) Int. Cl.
*B02B 3/00* (2006.01)
*G06T 7/00* (2017.01)
*H04N 5/232* (2006.01)
*G06T 7/70* (2017.01)
*H04N 5/225* (2006.01)

(52) U.S. Cl.
CPC ............ *G06T 7/70* (2017.01); *H04N 5/23203* (2013.01); *G06T 2207/30128* (2013.01); *H04N 5/2256* (2013.01)

(58) Field of Classification Search
CPC ......... G06T 7/0004; A01C 1/00; G01B 11/26; B02B 3/00
See application file for complete search history.

(56) References Cited

U.S. PATENT DOCUMENTS

| | | | | |
|---|---|---|---|---|
| 10,708,480 | B2* | 7/2020 | Wang | B29C 43/36 |
| 2008/0053273 | A1* | 3/2008 | Enokido | H01F 41/0273 |
| | | | | 75/246 |
| 2012/0237325 | A1* | 9/2012 | Flickinger | B65G 67/24 |
| | | | | 414/502 |
| 2013/0108537 | A1* | 5/2013 | Mikawa | H01L 21/0254 |
| | | | | 423/351 |
| 2015/0093969 | A1* | 4/2015 | Mase | B24C 11/00 |
| | | | | 451/38 |
| 2018/0339871 | A1* | 11/2018 | Umbanhowar | B01F 11/0094 |
| 2019/0246673 | A1* | 8/2019 | Park | A23P 20/18 |
| 2019/0265015 | A1* | 8/2019 | Michiwaki | G01B 7/18 |

OTHER PUBLICATIONS

Sielamowicz, I, et al. Experimental and Computational Analysis of Granular Material Flow In Model Silos. IPPT Reports on Fundamental Technological Research. Institute of Fundamental Technological Research. Polish Academy of Sciences. Warsaw, Poland. Jan. 2013; p. 5, Abstract; p. 21, Section 1.1.1—Introduction, First Paragraph; p. 22, Second Paragraph; p. 37, Section 1.1.5.6.1— Filing and Storing Pressures, Second Paragraph.
GranuTools(TM) Company Information downloaded from [https://web.archive.org/web/20161014225957/http:/www.granutools.com/], available Oct. 14, 2016, 2 pages.
GranuTools(TM), Granudrum, Granular Material Flow Analyzer, downloaded from [https://web.archive.org/web/20160812004101/http://granutools.com/products/Granudrum.html], available Aug. 12, 2016, 4 pages.
GranuTools(TM), Granudrum, The New Powder Rheometer, downloaded from [https://granutools.com/references/application-notes/instruments/granudrum-new-powder-rheometer/], 2018-2020, 6 pages.
Wojcik, A, et al. The Use of Photogrammetric Method for Measurement of the Repose Angle of Grannular Materials. Measurement. Oct. 2, 2017. DOI: https://fdoi.org/10.1016/j.measurement. 2017 .10.005; p. 3 of 24, Introduction Section, First Paragraph; p. 4 of 24, Third Paragraph; p. 7 of 24, First Paragraph, p. 7 of 24, Figures 1 a), 1 b), 1c), 1d), 1 f), 1g); p. 8 of 24, Fifth Paragraph to p. 9 of 24, Third Paragraph.

* cited by examiner

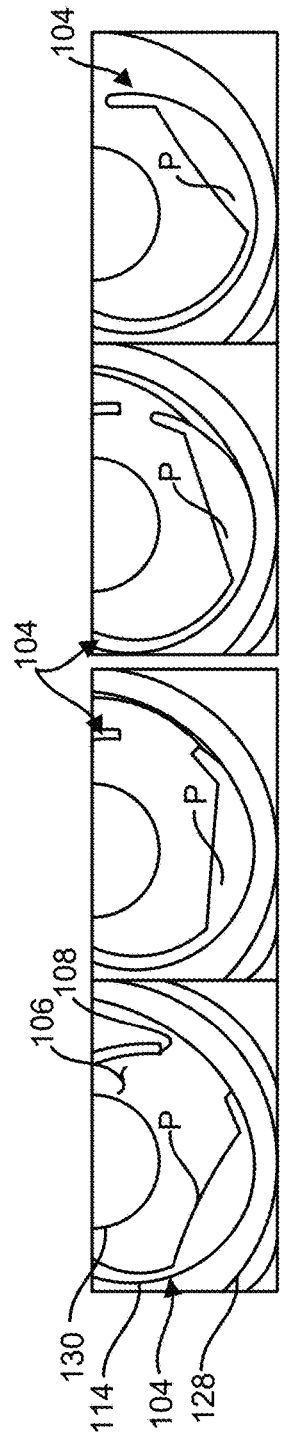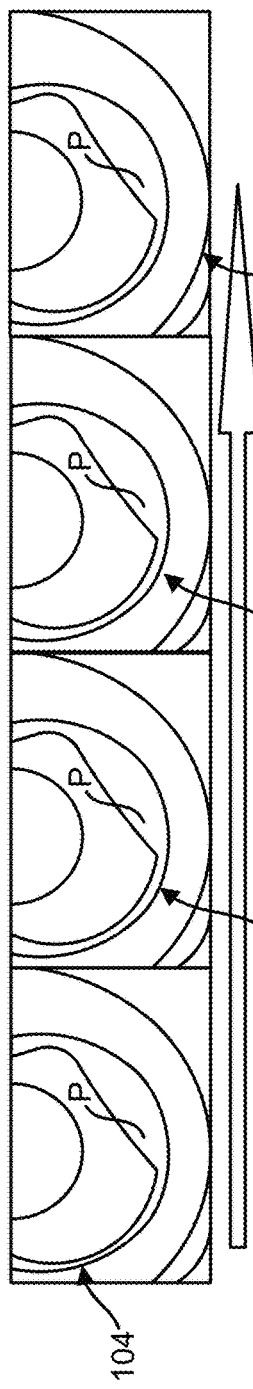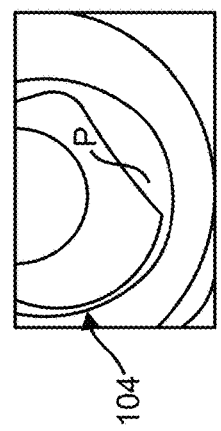

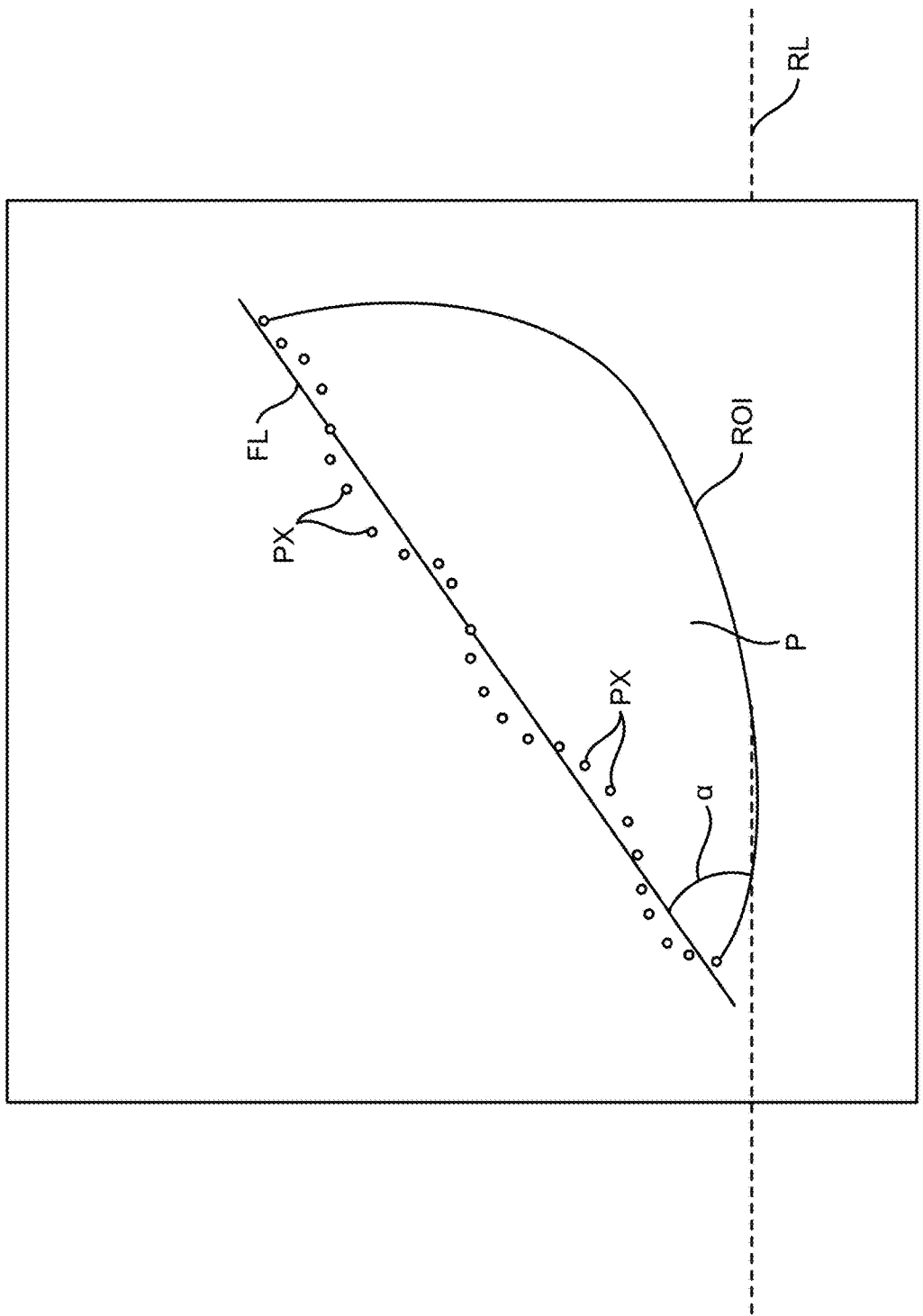

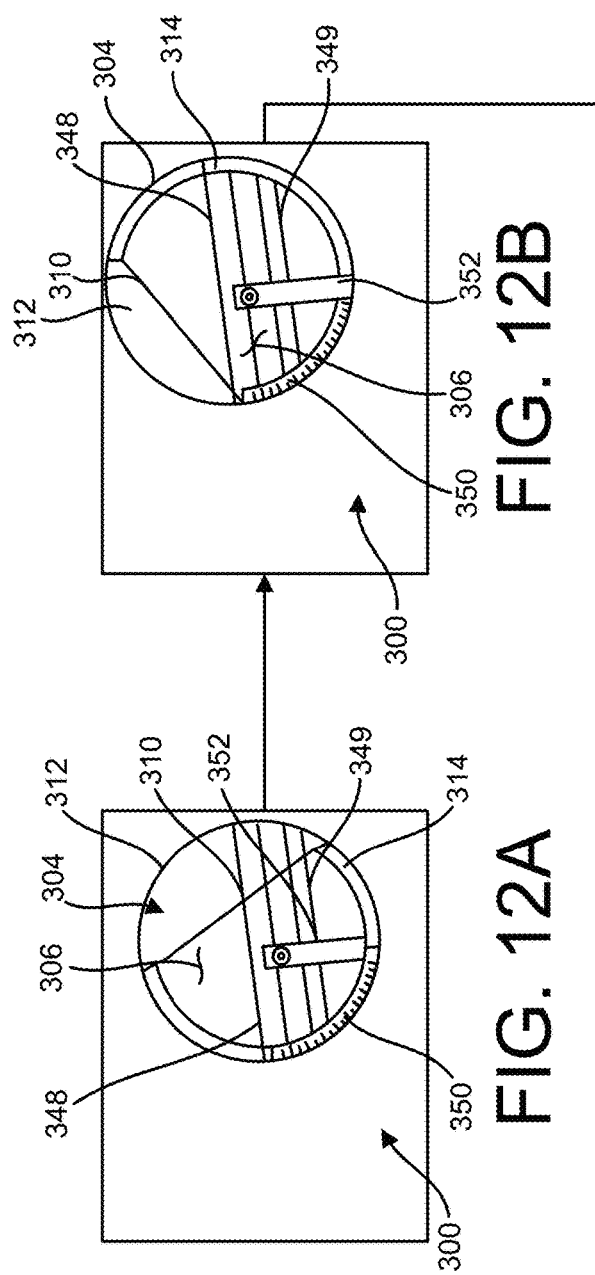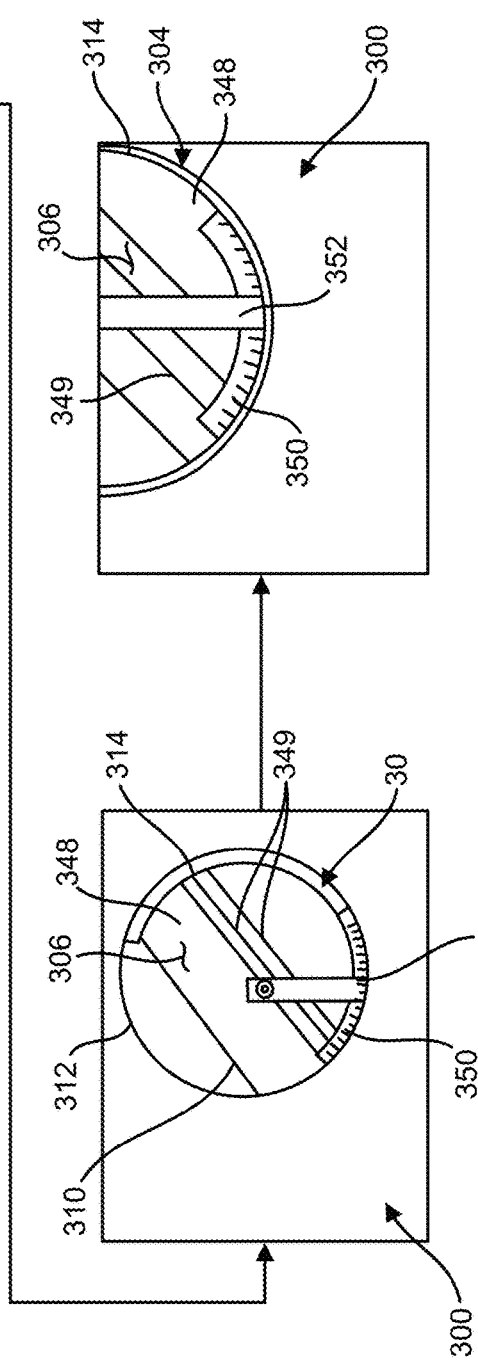

METHOD OF PROCESSING SEEDS AND SYSTEM FOR DETERMINING ANGLE OF REPOSE OF GRANULAR MATERIAL USED IN SEED PROCESS

CROSS-REFERENCE TO RELATED APPLICATIONS

This application claims priority to U.S. Provisional Patent Application Ser. No. 62/696,134, entitled "METHOD OF PROCESSING SEEDS AND SYSTEM FOR DETERMINING ANGLE OF REPOSE OF GRANULAR MATERIAL USED IN SEED PROCESS" and filed Jul. 10, 2018, which is hereby incorporated by reference in its entirety.

FIELD OF THE DISCLOSURE

This disclosure generally relates to a method of processing seeds in which an angle of repose of granular material used in the process is determined and to a system for measuring the angle of repose of the granular material.

BACKGROUND

Agricultural seeds are often processed before planting. For example, some seeds undergo a sorting or categorization process in which characteristics of individual seeds are identified and the seeds are sorted into groups according to the characteristics. In other processes, seeds are, for example, pelletized, coated, etc. To achieve optimal results, the granular materials are fully processed in each processing step. For example, seeds must be thoroughly polished during a polishing step or else they can become entangled with one another, making subsequent processing steps such as singulation and sorting less effective. Incomplete processing of seeds can also adversely affect seed sowing operations.

SUMMARY OF THE DISCLOSURE

In one aspect, a method of processing seeds comprises processing seeds in a processing step. An angle of repose of at least a portion of the processed seeds is determined. Whether the processed seeds have been sufficiently processed in the processing step is determined based on the determined angle of repose.

In another aspect, a system for determining an angle of repose of processed seeds comprises a receptacle defining a cavity and an opening in communication with the cavity for receiving the processed seeds therethrough. The receptacle has a support wall configured for supporting the processed seeds in the cavity in a pile. An image sensor faces the receptacle and is configured to capture an image of the pile of processed seeds received in the cavity. An image processor is operatively connected to the image sensor to receive the captured image from the image sensor. The image processor is configured to evaluate the image to determine an angle of inclination of the pile based on the image.

In another aspect, a measurement device for measuring an angle of repose of granular material comprises a receptacle comprising a front wall, a rear wall, and a support wall extending between the front and rear walls. The receptacle has an interior between the front and rear walls. The receptacle is configured to receive granular material in the interior such that the granular material is supported on the support wall. The front wall of the receptacle is at least somewhat transparent. A plate is pivotably mounted on the front wall for rotation about an axis with respect to the receptacle through a range of motion. The plate overlaps at least a portion of the front wall along at least a portion of the range of motion. The plate is at least somewhat transparent such that the interior of the receptacle is visible through the plate and the front wall when the plate overlaps the front wall. The plate has a perimeter edge margin and protractor scale markings spaced apart along at least a segment of the perimeter edge margin. The plate further comprises at least one indicator line. An indicator arm is pivotably mounted on the front wall for rotation about the axis with respect to the receptacle independently of the plate. The indicator arm extends radially outward from the axis.

Other features will be in part apparent and in part pointed out hereinafter.

BRIEF DESCRIPTION THE DRAWINGS

FIGS. 7A-7I are a sequence of elevations depicting the receptacle and granular material received therein at respective angular position;

FIG. 9 is an illustration of pixels defining the top of a seed pile in a region of interest of an image and a line fitted to those pixels;

FIGS. 12A-12D are elevations of a manual angle of repose measurement device at a plurality of positions;

Corresponding reference characters indicate corresponding parts throughout the drawings.

DETAILED DESCRIPTION

Figure 1:
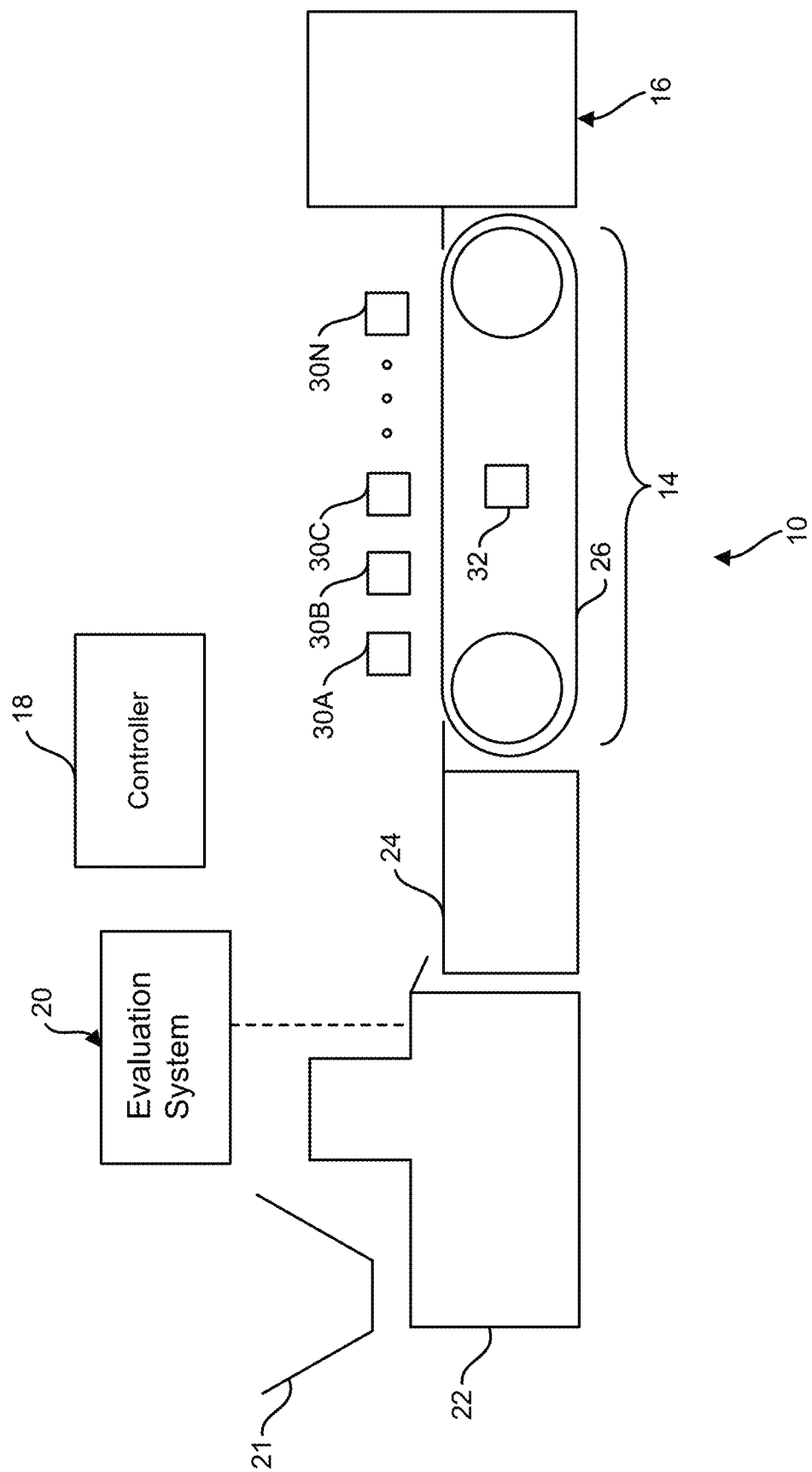
FIG. 1 is a schematic illustration of a seed sorting system.

The present disclosure pertains to evaluation systems for determining an angle of repose of granular material used in a seed processing system, as well as certain seed processing systems that include or can be used in combination with the evaluation system. Referring to FIG. 1, one embodiment of a seed sorting system (broadly, a seed processing system) is generally indicated at reference number 10. As will be explained in further detail below, the seed sorting system 10 is one example of a seed processing system with which an evaluation system 20 configured to measure an angle of repose of granular material can be used. In general, the system 10 includes components that are used to conduct a seed sorting process, but other systems or components configured to conduct other seed processes can be used in other embodiments. In FIG. 1, the components of the seed sorting system are schematically illustrated as being components of a single inline process. It will be appreciated, however, that in one or more embodiments, one or more of the components are operated as discrete processes separate from the other components in the seed sorting system 10. A controller 18 (e.g., one or more processors and one or more suitable memory modules) is programmed to operate one or more aspects of the system 10.

As explained below, the illustrated seed sorting system 10 includes the evaluation system 20, which is generally configured for evaluating the progress of one or more process steps by measuring an angle of repose of granular material being processed. In the illustrated embodiment the evaluation system 20 is configured to determine the angle of repose of agricultural seeds (e.g., tomato seeds, pepper seeds, etc.) to evaluate the progress of a polishing process conducted by a seed polisher 22, but in other embodiments the evaluation system could be used to evaluate the progress of other processing steps and/or to determine the angle of repose of other granular materials (e.g., powder seed treatment materials, pelletizing materials, etc.). In one or more embodiments, the seed polisher 22 is a standalone device apart from the seed sorting system 10 or other seed processing system. It is also understood that, in one or more embodiments, the evaluation system 20 is a standalone device apart from the seed sorting system 10 or other seed processing system.

In general, a hopper 21 imparts seeds to the polisher 22, and the polisher is configured to polish the seeds. In one or more embodiments, the polished seeds are conveyed to a singulator 24 of the seed sorting system 10 after polishing. Suitably, the polisher 22 can de-awn, de-beard, remove seed hairs from, remove debris from, or scarify the seeds. Those skilled in the art will appreciate that polishing can disentangle the seeds or otherwise facilitate the later separation or singulation of the seeds using the singulator 24. Polishing can be used for other things besides preparing seeds for singulation in other embodiments. As described below, the evaluation system 20 in the illustrated embodiment is configured to receive a sampling of seeds from the polisher 22 to evaluate whether the seeds are sufficiently polished for effective singulation by the singulator.

After the seeds are polished, the polished seeds can be fed to the singulator 24. In the illustrated embodiment, the singulator 24 singulates the polished seeds and conveys the singulated seeds to an imaging and analysis assembly 14 used in combination with a seed sorting assembly 16. Suitably, the singulator 24 is configured to arrange the seeds in manner that enables the imaging and analysis assembly 14 to individually image and analyze the seeds. In one embodiment, the singulator 24 comprises one or more vibratory feeders (not shown) that impart vibratory energy to the polished seeds to transport the seeds single-file along vibratory channels and thereby arrange the seeds in single-seed rows in the channels. In one or more embodiments, the vibratory energy also spaces the seeds from one another within each row. Thus, the singulator 24 conveys the individually spaced seeds in each row to the imaging and analysis assembly 14 for individually imaging and analyzing the seeds.

Any suitable imaging and analysis assembly can be used to acquire images of individual seeds and analyze the images to group individual seeds into one or more categories according to one or more identified characteristics based on the images. In the illustrated embodiment, the imaging and analysis system 14 includes a conveyor 26 for conveying the singulated seeds through the imaging and analysis system and a plurality of imaging devices 30A-30N and 32 mounted above and below the conveyor for capturing images of the singulated seeds. In certain embodiments, one or more of the imaging devices 30A-30N, 32 can have different imaging modalities. For example, one or more of the imaging devices 30A-30N, 32 can be configured to capture 2D images, 3D images, x-ray images, hyperspectral images, infrared images, ultrasonic images, etc. The imaging devices 30A-30N, 32 are configured to transmit the captured images for each seed to the controller 18, which analyzes the images and categorizes the individual seeds into one or more groups based on one or more characteristics such as size, shape, color, texture, embryo size, morphology, endosperm content, internal free space, etc. For example, in one embodiment, the controller 18 categorizes the seeds into one of two groups, defective and non-defective (e.g., defective seeds may be identified as diseased, discolored, or mechanically damaged seeds). The controller 18 transmits control signals to the sorting assembly 16 that direct the sorting assembly to physically sort the seeds into the categorized groups determined by the controller. For example, the controller 18 directs the sorting system 16 to arrange the seeds at different locations according to their determined group.

Figure 3:
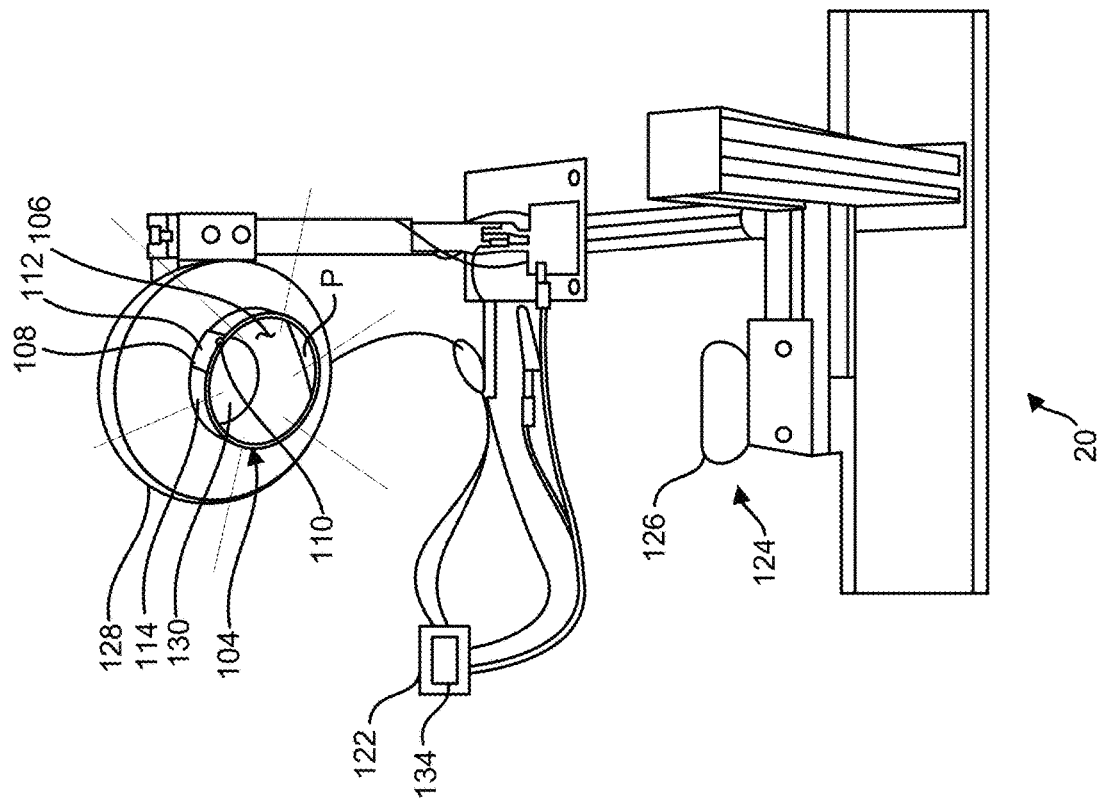
FIG. 3 is a perspective view similar to FIG. 2 illustrating a backlight of the evaluation system illuminating a receptacle of the evaluation system.
Figure 2:
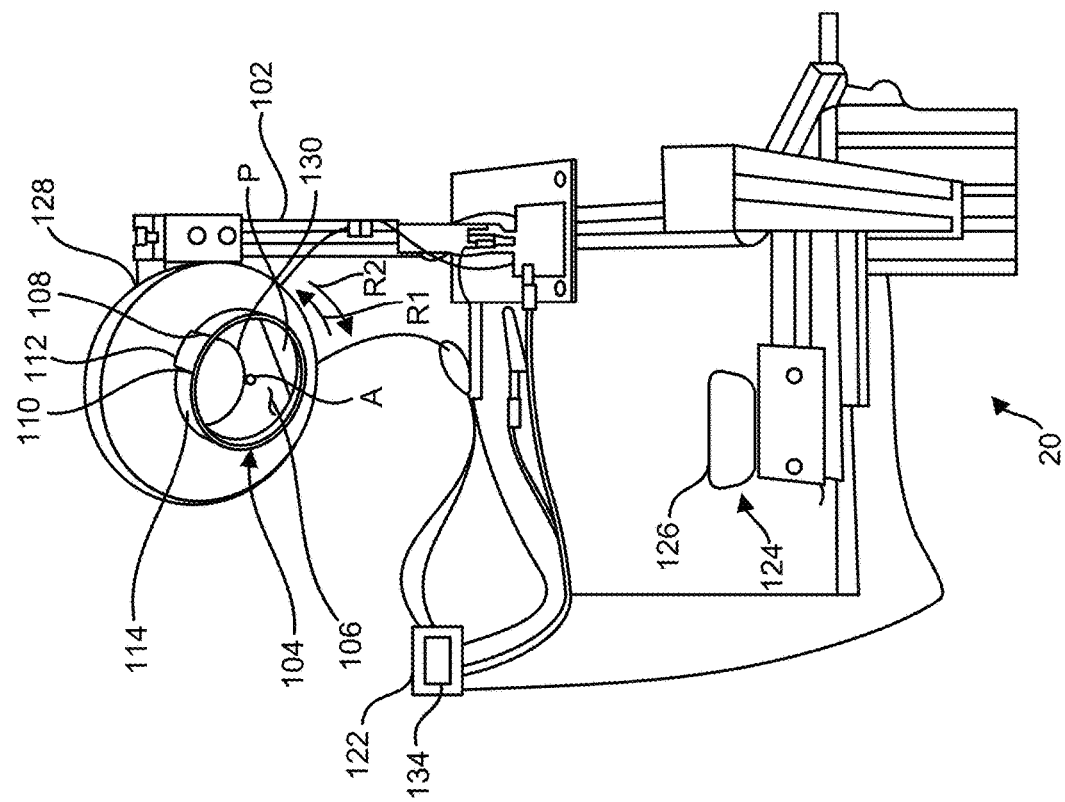
FIG. 2 is a perspective of an evaluation system of the seed sorting system and schematically illustrating a controller of the evaluation system.
Figure 4:
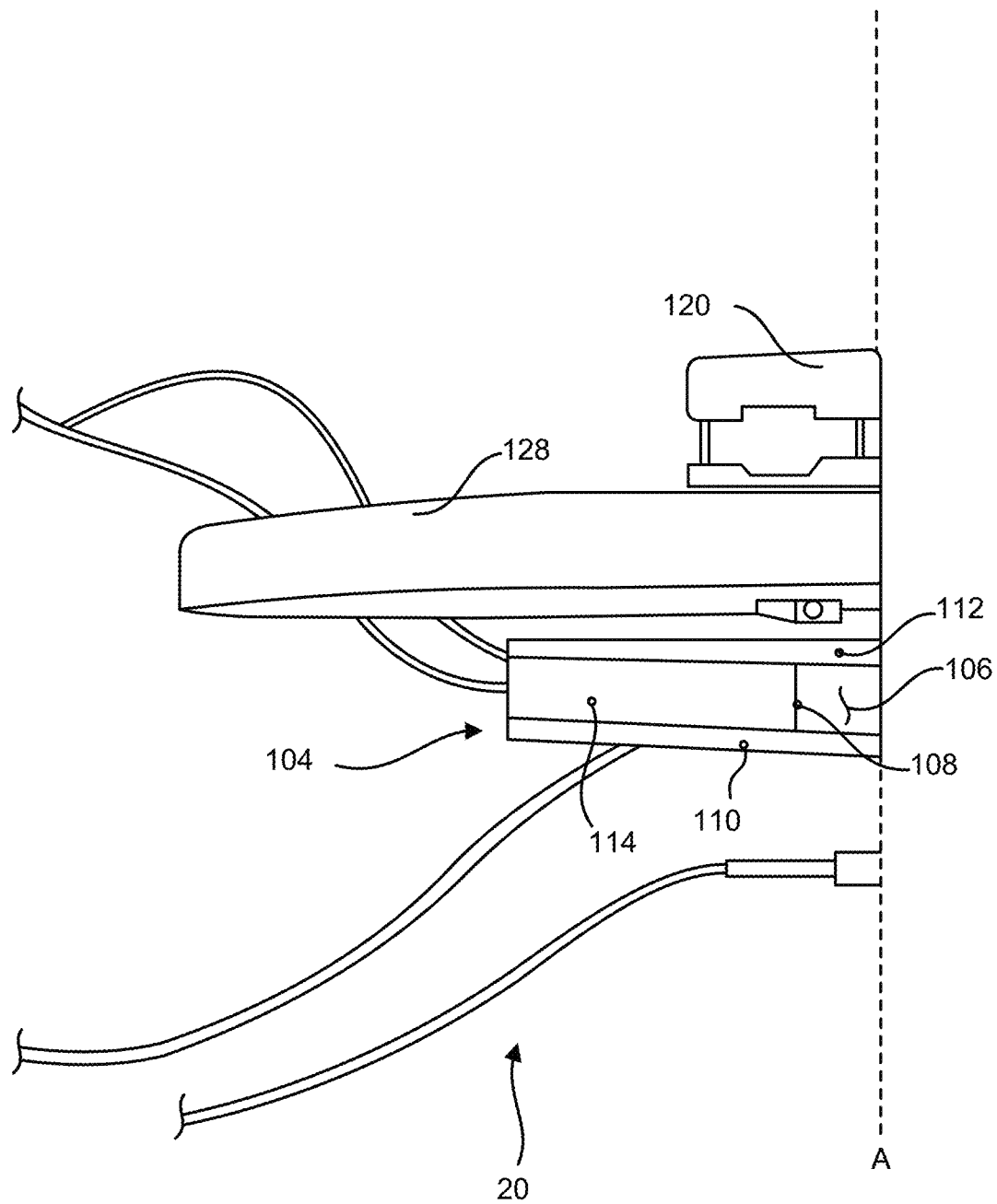
FIG. 4 is a partial top plan view of the evaluation system.

Referring to FIGS. 2-4, one embodiment an evaluation system 20 that is configured to determine an angle of repose of seeds (e.g., a batch of seeds or a sample from a batch of seeds or a sample from a continuous processing of seeds) from the polisher 22 will now be described in greater detail. Although the illustrated evaluation system 20 is configured to receive seeds after a polishing step of the seed sorting process 10, it will be understood that the evaluation system 20 could also be used to evaluate samples of granular material during other process steps of the illustrated seed sorting process or another seed process. As explained below, the illustrated evaluation system 20 is generally configured to determine the angle of repose of the seeds from the polisher to evaluate whether the seeds have been sufficiently polished to allow for effective singulation.

The evaluation system 20 includes a base 102 and a receptacle 104 mounted on the base for rotation with respect to the base about a generally horizontal axis of rotation A (FIG. 4). The receptacle 104 defines a cavity 106 for receiving a pile P of granular material (e.g., polished seeds). In addition, the receptacle 104 defines an opening 108 in communication with the cavity 106. Seeds or other granular material are placed into the cavity 106 through the opening 108. In the illustrated embodiment, the cavity 106 has a generally circular cross-sectional shape in a plane perpendicular to the axis of rotation A and has a generally uniform depth along the axis of rotation. An embodiment could be created without including a generally circular cross-section, such as an oval or other shape where the movement of the seeds along the surface can be calculated (see, for example, the square shaped cavity 206 in FIGS. 10 and 11). The receptacle 104 includes a front wall 110, a rear wall 112 spaced apart from the front wall along the axis of rotation A, and a support wall 114 extending between the front and rear walls along the axis of rotation. In certain embodiments, the internal surface of the support wall 114 has a rough surface texture. The front and rear walls 110, 112 are joined to the support wall 114 to define the generally cylindrical cavity 106. In the illustrated embodiment, each of the front and rear walls 110, 112 comprises a transparent, generally circular disc formed from, for example, acrylic material. In the illustrated embodiment, the support wall 114 has an annular shape (e.g., a circular arc shape) and extends between the perimeter edge margins of the front and rear walls 110, 112 to support the pile P of granular material received in the cavity 106. In other embodiments, the support wall can have other arcuate shapes or non-arcuate shapes. In the illustrated embodiment, the support wall 114 comprises opaque material (e.g., plastic). The illustrated support wall 114 defines the opening 108 leading into the cavity 106. A door (not shown) may be coupled to the support wall 114, such as by a hinge or other fastener, to allow selective covering and uncovering of the openings 108. It should be noted that the door does not need to be directly fastened, and may be placed over an opening, or there also may a removeable front or rear. In certain embodiments, the annular support wall 114 extends at least about 180° (e.g., at least about 270°) of the arc of a circle. As explained below, the annular support wall 114 facilitates supporting a pile P of granular material in the cavity 106 at a plurality of positions of the receptacle 104 that are angularly spaced about the axis of rotation.

Referring to FIG. 4, a driver 120 is supported on the base 102 and is operatively connected to the receptacle 104 to selectively drive rotation of the receptacle about the axis of rotation A with respect to the base 102. In certain embodiments, the driver 120 can comprise a motor, such as a servo motor and/or a stepper motor. It is understood that in other embodiments, other types of drivers could be used or the receptacle could be rotated or tilted manually. Referring to FIGS. 2 and 3, a controller 122 (e.g., one or more processors and one or more suitable memory modules and or one or more amplifiers) is operatively connected to the driver 120 to control rotation of the receptacle 104 about the axis A. As explained below, the controller 122 is configured to actuate the driver 120 to synchronize rotation of the receptacle 104 with activation of an imaging system, generally indicated at 124.

As will be explained in further detail below, the imaging system 124 is configured to determine the orientation of the top of the pile P of seeds in the receptacle 104. By rotating the receptacle 104, the pile P can be rearranged so that at least a portion of the top of the pile is oriented at the angle of repose for the granular material. When the pile P of granular material is received in the cavity 106, rotation of the receptacle 104 about the axis of rotation in either direction can cause an angle of inclination of the pile to change until the pile is at the angle of repose of the granular material, at which time additional rotation will cause the pile to slump or slide (FIGS. 7A-7I show one example of the change on slope caused by rotation of the receptacle 104). When the slope of the pile P begins to stay about the same with further rotation of the receptacle, the top of the pile is oriented at about the angle of repose of the granular material. Thus, as explained below, the driver 120 is configured to drive rotation of receptacle 104 about the axis of rotation A to a plurality of angular positions to identify the angle of repose of granular material received in the cavity 106. It is understood that the driver 120 can incrementally rotate the receptacle 104 to each of the plurality of angular positions or continuously rotate the receptacle so that the receptacle passes through the positions as it rotates. In one or more embodiments, the receptacle incrementally rotates 104 at least 360° about the axis of rotation A before completing the determination of the angle of repose. In certain embodiments, the angle of repose is determined based on rotation about the axis of rotation A of less than 360°.

Referring to FIGS. 2-4, the imaging system 124 includes a camera 126 (broadly, an image sensor) and a backlight 128 (broadly, a light source). The camera 126 is mounted on the base 102 in operative alignment with the receptacle 104 to capture images of the receptacle. In one or more embodiments, the camera 126 and the receptacle 104 are aligned at spaced apart positions along the axis of rotation A. Suitably, the camera 126 is oriented horizontally, pointed in a direction substantially parallel to the axis of rotation A. The camera 126 and the receptacle 104 are oriented relative to one another so that the front wall 110 of the receptacle faces the camera. Because the front wall 110 is transparent, the camera 126 can capture images of the pile P of granular material supported in the cavity 106 inside the receptacle 104. The backlight 128 is positioned behind the rear wall 112 of the receptacle 104 for illuminating the cavity 106 through the transparent rear wall. In the illustrated embodiment, the backlight 128 has an illumination surface facing the back wall 112 that is larger than the receptacle 104 and is positioned to illuminate substantially the entire cavity 106 from behind. This backlighting arrangement enables the camera 126 to produce images (broadly, image data) having a high degree of contrast (e.g., as shown in FIG. 7) between portions of the cavity 106 that are filled with granular material (filled space) and portions of the cavity that are free of granular material (non-filled space). In the illustrated embodiment, the backlight 128 has an illumination hole 130 in which the backlight does not illuminate the receptacle 104. The illumination hole 130 is spaced apart above the pile P of granular material received in the cavity 106 in images captured by the camera 126. In the captured images, the hole 130 also contrasts with non-filled space in the sampling cavity. Although the illustrated embodiment uses a camera as an image sensor, other embodiments can use other types of image sensors to capture images of the sampled granular material received in the receptacle. Likewise, while the illustrated embodiment uses a backlight, other embodiments can use other types of light sources to illuminate the cavity.

The controller 122 is operatively connected to the camera 126 to synchronize image capture with rotation of the receptacle 104 to a plurality of angularly spaced apart positions. The controller 122 is configured to direct the driver 120 to incrementally rotate the receptacle 104 to a plurality of positions that are angularly spaced apart about the axis of rotation A. At each incremental position, the controller 122 directs the camera 126 to capture an image of the backlit receptacle 104. As explained below, an image processor 134 is configured to analyze the images to determine the angle of repose of the material an orientation or an angle of inclination of the pile P of granular material received in the cavity 106. The controller 122 can be configured to direct the evaluation system 20 to capture images of the receptacle 104 at a plurality of positions that are angularly offset from a reference position, for example, in which the cavity receives the sample of granular material. It should be noted that the receptacle 104 does not need to be stopped to capture the images.

Suitably, the controller 122 is configured to direct the evaluation system 20 to capture images at a range of angularly offset positions that is suitable for determining an angle of repose of granular material received in the cavity 106. For example, a range of angular positions suitable for determining the angle of repose can include a plurality of angular positions at which the pile P is oriented generally at the angle of repose of the granular material. Rotating the receptacle 104 in only one of first and second rotational directions R1, R2 (FIG. 2) will cause the angle of inclination of the pile P to change significantly until it reaches the angle of repose for the granular material, at which time the pile begins to collapse (e.g., slide or slump) and the angle of inclination of the pile generally remains constant with some variations due to the collapsing of the pile. In one embodiment, the controller 122 ensures an adequate range of angular positions by capturing images of the receptacle 104 at predetermined angular positions for each sample of granular material it receives (e.g., a predetermined range of angular positions of at least 360° or less than 360°). In other embodiments, the controller 122 is configured to determine the range of positions based on feedback from the image processor 134. For example, the controller 122 can determine the range of receptacle positions required to accurately measure the angle of repose of the granular material by determining when the angle of inclination of the pile P is substantially constant for n incremental positional adjustments in the same rotation direction R1, R2, where n is greater than or equal to 2. It will be understood that an image system could continuously image the pile as the receptacle is driven in continuous rotation.

In one embodiment, the controller 122 is configured to direct the driver 120 to rotate the receptacle 104 in both rotational directions. For example, the controller 122 first directs the driver 120 rotate the receptacle 104 in the first rotational direction R1 to a first set of angularly spaced positions and then directs the driver to rotate the receptacle in the second rotational direction R2 to a second set of rotational positions. Suitably, each of the first and second sets of positions covers a sufficiently large angular range to allow separate angle of repose measurements to be determined based on the image data for the respective set of positions. For example, in a first set of angular positions, the angle of repose would be determined based on the pile P sloping from right to left as shown in FIG. 2 and in the second set of angular positions the angle of repose would be determined based on the pile sloping from left to right as shown in FIG. 2. In one embodiment, the image processor 134 is configured to determine the angle of repose by averaging the absolute values of the angle of repose measurements determined from images of the first and second sets of positions. Averaging the angle of repose measurement can account for measurement errors induced by misalignment between the camera 126 and true horizontal.

Figure 6:
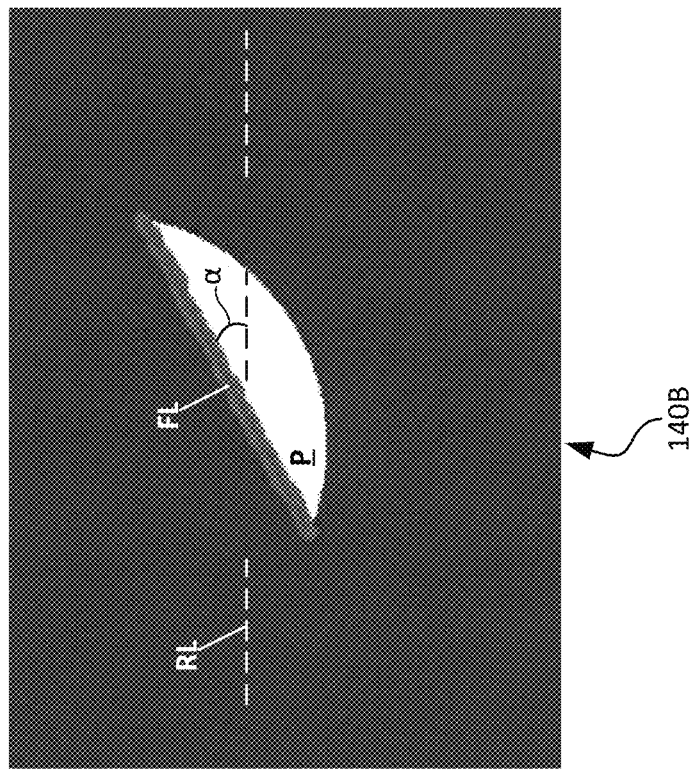
FIG. 6 is a screenshot of the region of interest of the image including a fitted line indicated in green.
Figure 5:
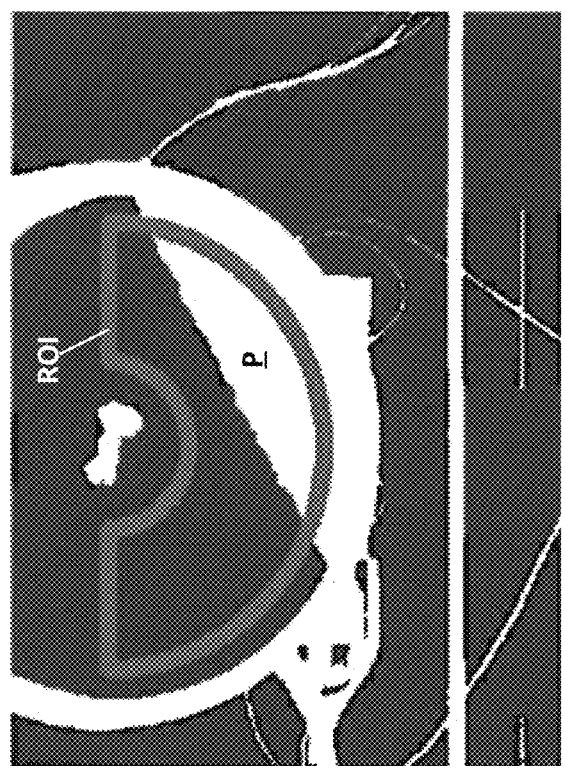
FIG. 5 is a screenshot of an image captured by the evaluation system and includes an outline of a defined region of interest of the image in green.

The image processor 134 is operatively connected to the camera 126 to receive the captured images from the camera and is configured to determine an angle of inclination of the pile P of granular material received in the cavity 106 based on the images. Referring to FIGS. 5 and 6, in one embodiment, the image processor 134 is configured to process each image from the camera 126 to produce one or more processed images 140A, 140B. In the illustrated embodiment, the image processor 134 is configured to binarize and invert the raw image (examples of raw images are shown in FIGS. 7A-7I) to produce a binarized and inverted image 140A by mapping light areas of the image to dark and dark areas of the image to light. In the binarized and inverted image 140A shown in FIG. 5, the filled space occupied by the pile P of granular material is rendered substantially in white and the non-filled space is rendered substantially in black. The image processor 134 is further configured to extract a region of interest ROI from the inverted image 140A to produce an extracted image 140B (FIG. 6). The extracted image 140B excludes the end portions of the pile P, which may not be consistent with the middle portion included in the region of interest ROI. In the illustrated embodiment, the region of interest ROI also excludes the hole 130 of the backlight and the irregularities from the inner edge of the support wall 114.

Referring to FIG. 9, after extracting the region of interest ROI of the binarized and inverted image, the image processor 134 is configured to fit a line FL through pixels that define the top of the pile P. Referring to FIG. 9, to determine the fitted line FL, the image processor 134 identifies the pixels PX representing the top of the pile P. In one or more embodiments, the image processor 134 calculates a least square fit based on the pixels PX to determine the fitted line FL. It will be understood that other methods of fitting a line to the pixels may be used in one or more embodiments. In certain embodiments, the image processor 134 can be configured to determine how well the fitted line FL represents the pixels PX by calculating a statistical $R^2$ for the pixels and the fitted line. As will be appreciated, the statistical $R^2$ provides a percentage that indicates how well the response variable (in this case, the pixels PX) are explained by the linear model (in this case, the fitted line FL). When the statistical $R^2$ is close to 1, the image processor 134 may determine that the fitted line FL provides a good representation of the pixels representing the top of the pile P. When the statistical $R^2$ value is significantly less than 1, the image processor 134 may determine that the fitted line FL is a poor or unreliable representation of the pixels representing the top of the pile P.

Referring to FIGS. 6 and 9, after the fitted line FL representing the top of the pile P is determined, the image processor 134 is configured to determine an angle α of the fitted line with respect to the reference line RL. In the illustrated embodiment, the reference line RL is known to be horizontal. When the reference line RL is horizontal, the angle α between the fitted line FL and the reference line is a measurement of the "angle of inclination" of the top of the pile P. It will be appreciated, however, that the reference line RL can be a line that is not horizontal in certain embodiments. When the reference line RL is not horizontal, angle of inclination can be calculated by determining an offset angle between the reference line and true horizontal.

Figure 8:
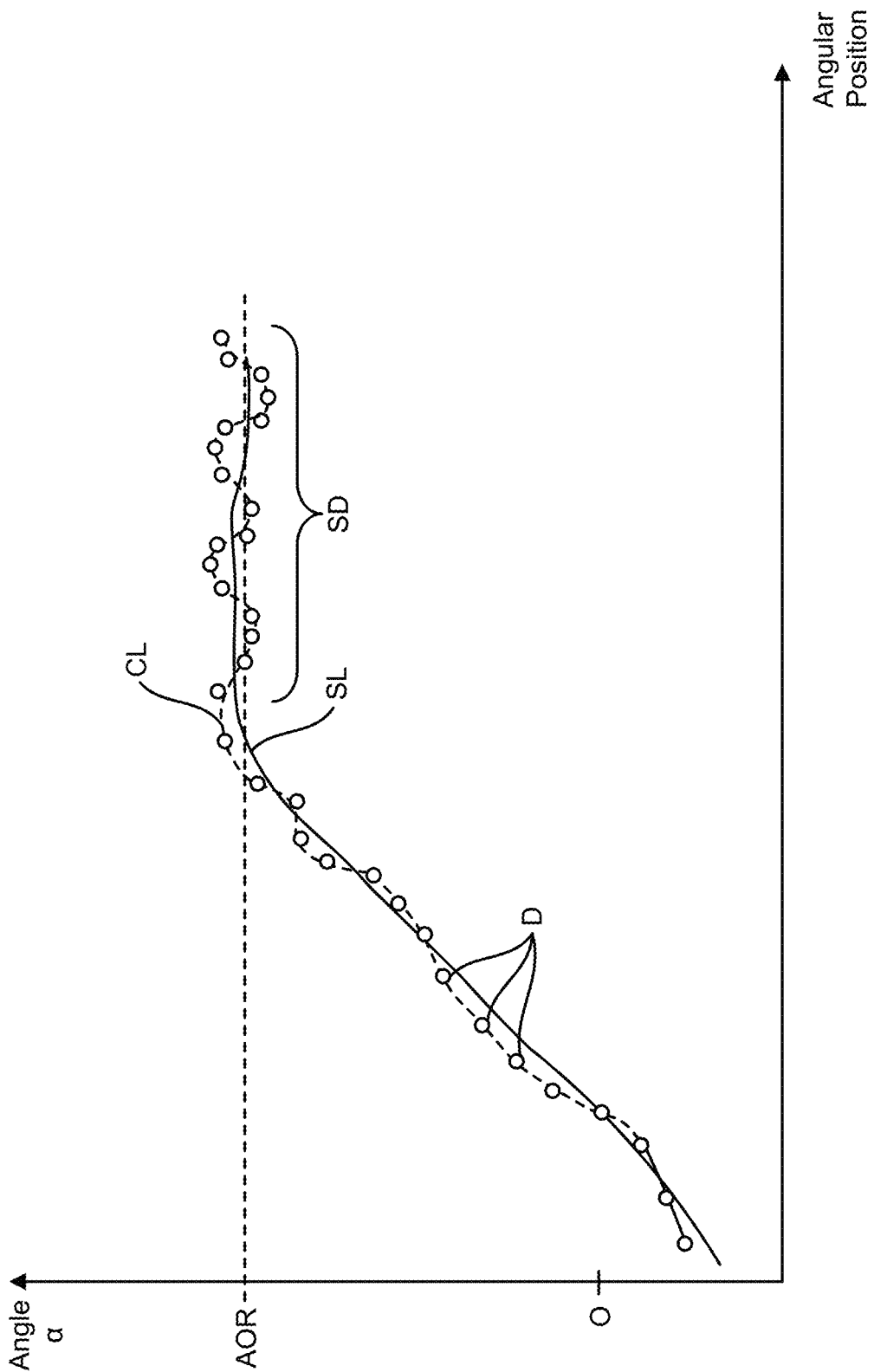
FIG. 8 is a line graph charting a determined angle of a top of the pile of granular material received in the receptacle along a vertical axis with respect to a position of the receptacle along a horizontal axis.

The determined angles of inclination a for the images at the angularly spaced positions of the receptacle 104 are evaluated to determine the angle of repose for the granular material. FIG. 8 shows a graph of data points D, wherein for each data point, an angular position of the receptacle 104 is plotted on the x-axis and the determined angle of inclination a for the pile P at the respective angular position of the receptacle is plotted on the y-axis. In particular, FIG. 8 includes data points D corresponding to the pile P as shown in the angular positions of the receptacle 104 shown in FIGS. 7A-7I. As explained above, the range of angular positions of the receptacle 104 that are used or required to determine the angle of repose can vary and can be greater than or equal to 360° or less than 360° in various embodiments. As can be seen in FIGS. 7A-7I, the pile P initially is inclined in the right to left direction (FIGS. 7A and 7B) and is rotated until the pile inclines in the left to right direction (FIGS. 7C-7I). This change in orientation of the pile P is represented as a zero crossing on the graph of FIG. 8. That is, when the top of the pile P is generally horizontal (broadly, parallel to the reference line RL), the image processor 134 determines that the angle of inclination a is zero; when the top of the pile inclines from left to right with respect to the reference line, the image processor determines that the angle of inclination is negative; and when the top of the pile inclines from right to left with respect to the reference line, the image processor determines that the angle of inclination is positive.

As the data points D are plotted, the image processor 134 is configured to determine a connecting line CL that connects the data points. In addition, the illustrated image processor is configured to determine a smoothed line SL through the data points D based on a moving average of a plurality of (e.g., three) data points. The system is configured to determine the slope of the smoothed line SL. As explained above, when the seed pile S begins to slide or slump and the angle of inclination a stops increasing in absolute value with the incremental rotation of the receptacle 104, the top of the pile P is oriented at about the angle of repose AOR for the granular material. To determine when the angle of inclination a is no longer increasing, the image processor 134 is configured to determine when the slope of the smoothed line SL falls below a threshold value. After the slope of the smoothed line SL is determined to have fallen below the threshold value, the image processor 134 is configured to begin collecting a set SD of a predetermined number of data points D for use in determining the angle of repose AOR. The image processor is configured to calculate the angle of repose AOR as the average of the angles of inclination a of the data points D in the set SD. Another method to find the images that contain the angle of inclination of interest is to start rotating the receptacle and wait some time while taking images until one is sure that the seed pile is slumping. The images taken in such a way only contain the angle of inclination which can be used to determine the angle of repose.

Referring again to FIG. 1, FIG. 2, and FIG. 3, one embodiment of a method of using the evaluation system 20 with the seed sorting system 10 will now be briefly described, with the understanding that the evaluation system can also be used independently or with another seed processing system in other embodiments. Initially, seeds are loaded into the seed polisher 22. The polisher 22 then begins the process of polishing the seeds. Periodically, the seeds being polished are sampled from the polisher and placed into the cavity 106 of the receptacle 104 in the evaluation system 20. In one embodiment, the controller 18 can direct the polisher 22 to automatically dispense samples of the seeds into the receptacle 104, for example, at predetermined intervals. In another embodiment, the technician manually samples seeds from the polisher 22 and places them in the receptacle 104. In yet another embodiment, an entire batch of polished seeds may be added to the receptacle 104, either by automation or manually. In still another embodiment, the evaluation system is integrated into the polisher to receive the seeds as they are being polished.

The evaluation system 20 is configured to determine an angle of repose of the seeds in the receptacle 104. With the backlight 128 illuminating the cavity 106 and its contents, the controller 122 directs the driver 120 to rotate the receptacle 104 incrementally through a range of angularly spaced positions and at each position synchronously directs the camera 136 to capture an image of the receptacle. In one embodiment, the controller 122 directs the driver 120 to rotate the receptacle 104 from the reference position in which it receives the seeds in a first direction R1 to a first set of positions and then directs the driver to rotate the receptacle in a second direction R2 to a second set of positions. For each captured image, the image processor 134 inverts and binarizes the image and extracts the region of interest ROI. The image processor 134 determines the pixels PX defining the top of the pile in the region of interest ROI and fits a line FL to the pixels (see FIG. 9). In certain embodiments, the image processor 134 evaluates the quality of the representation of the fitted line by calculating a statistical $R^2$ comparing the fitted line and the pixels PX. For each image, the image processor 134 calculates the angle α of the fitted line with respect to the reference line RL. Suitably, a horizontal reference line RL is used such that the angle α represents the angle of inclination of the pile P.

Referring to FIG. 8, using the data points D representing the determined angle of inclination a for each angular position of the receptacle 104 as it is rotated in the first direction R1, the image processor 134 calculates a first smoothed line SL. The image processor 134 determines when the slope of the first smoothed line SL falls below a threshold and then determines a first measurement of the angle of repose AOR as the absolute value of an average of the determined angles of inclination a for a subset SD of the data points D at angular positions after the slope has fallen below the threshold. Then, using the points D representing the determined angle α for each angular position of the receptacle 104 as it is rotated in the second direction R2, the image processor 134 calculates a second smoothed line SL. The image processor 134 determines when the slope of the second smoothed line SL falls below a threshold and then determines a second measurement of the angle of repose AOR as the absolute value of an average of the determined angles of inclination a for a subset SD of the data points S at angular positions after the slope has fallen below the threshold. In one or more embodiments, the image processor 134 calculates an average of the first and second angle of repose measurements to determine a final angle of repose measurement for the seeds.

It has been found that the angle of repose of seeds can be a useful signal of whether the seeds have been sufficiently polished for effective singulation. Ineffectively polished seeds can tend to clump together more than effectively polished seeds. This can cause ineffective singulation, which may require manual intervention or restarting of a seed sorting process. But, in addition to adversely affecting singulation, the entanglement of poorly polished seeds causes the seeds to have a different angle of repose than effectively polished seeds. For a given type of seed (e.g., tomato seed, pepper seed, etc.) a suitable threshold angle of repose can be empirically derived through experimentation and used by the sorting system 10 to determine whether the seeds are ready for singulation. For example, in one embodiment the sorting system controller 18 is operatively connected to the evaluation system controller 122 to receive an indication of the determined angle of repose. The controller 18 can be configured to compare the determined angle of repose to an empirically derived threshold angle of repose to determine if the seeds are sufficiently polished before singulation or whether additional polishing should occur before singulation. In another embodiment, the determined angle of repose can be used in other ways (e.g., be considered by a human user) to evaluate whether the seeds have been sufficiently polished for singulation. If the seeds are determined to be sufficiently polished, the controller 18 or the user directs the polisher 22 to convey the seeds to the singulator 24. If the seeds are not determined to be sufficiently polished, the controller 18 or the user directs the polisher 22 to continue polishing until the evaluation system 20 is used to determine the angle of repose of another sample. This process is repeated until the determined angle of repose indicates that polishing is complete (e.g., reaches a predetermined threshold value), at which point the controller 18 or the user causes the polished seeds to be moved to the singulator 24.

In one embodiment, the singulator 24 singulates the seeds as described above and conveys the singulated seeds to the imaging and analysis system 14. The imaging and analysis system 14 images the individual seeds and categorizes them according to predefined characteristics. As the conveyor 26 conveys the individual seeds to the sorting device 16, the controller 18 transmits control instructions to the sorting device that direct the sorting device to physically group each seed by its determined category.

Although in the illustrated embodiment the evaluation system 20 is used to evaluate seeds being processed by the polisher 22, in other embodiments the evaluation system could be used before the seeds are processed or to evaluate the progress of other processing steps. For example, in one embodiment, an evaluation system 20 is used to measure an angle of repose of samples of seeds being singulated by the singulator. Properly singulated seeds have a different angle of repose than more poorly singulated seeds. Thus, a measure of whether the seeds are properly singulating could be made during singulation by sampling the seeds during the singulation process and measuring the angle of repose of the samples.

In another embodiment, an evaluation system 20 is used to measure an angle of repose of samples of powders used for pelletizing seeds during a mixing process of the powders. Properly mixed powders would be expected to have a different angle of repose than more poorly mixed powders. Thus, the quality of the mixing of the powders could be evaluated by sampling the mixed powder during the mixing process and measuring the angle of repose of the samples. In still other embodiments, the evaluation system 20 could be used to measure the angle of repose of raw powder prior to mixing and/or pelleting as a quality check of the powder. If the angle of repose of powder known to have the desired composition is known, it can be compared to the determine angle of repose of the powder sample to evaluate whether the raw powder has the desired composition. A difference could indicate that the composition of the sampled powder deviates in some way from the desired composition.

In another embodiment, the evaluation system 20 is used to measure an angle of repose of samples of pelletized or coated seeds during or after a pelleting or coating process. Properly pelletized seeds would be expected to have a different angle of repose than more poorly pelletized seeds. Likewise, properly coated seeds would be expected to have a different angle of repose than more poorly coated seeds. As above, a threshold angle of repose for properly pelletized or coated seeds could be determined empirically, and the effectiveness of the pelletizing or coating of seeds during a later pelletizing process could be evaluated by sampling the later-pelletized or later-coated seeds and measuring the angle of repose of the samples.

In yet another embodiment, the evaluation system 20 is used to measure an angle of repose of samples of seeds during a drying process. Properly dried seeds would be expected to have a different angle of repose than more poorly dried seeds. As above, a threshold angle of repose for properly dried seeds could be determined empirically, and the effectiveness of drying of seeds during a later drying process could be evaluated by sampling the later-dried seeds and measuring the angle of repose of the samples. The evaluation system 20 can be used to evaluate drying based on the angle of repose of the seeds while the drying process is in progress, e.g., while the seeds are being dried in a rotating drum.

In still another embodiment, the evaluation system 20 is used to measure an angle of repose of samples of seeds during a priming process. Properly primed seeds would be expected to have a different angle of repose than more poorly primed seeds. As above, a threshold angle of repose for properly primed seeds could be determined empirically, and the effectiveness of the priming of seeds during a later priming process could be evaluated by sampling the later-primed seeds and measuring the angle of repose of the samples.

In an embodiment, the evaluation system 20 is used to measure an angle of repose of samples of seeds (e.g., cotton seeds) during a delinting process. Properly delinted seeds would be expected to have a different angle of repose than seeds that are not properly delinted. As such, a threshold angle of repose for properly delinted seeds could be determined empirically, and the effectiveness of the delinting of seeds during a later delinting process could be evaluated by sampling the later-delinted seeds and measuring the angle of repose of the samples.

Thus, it can be seen that the evaluation system 20 has wide application to processes involving granular materials in the production of seeds. To provide quality assurance, the angle of repose of a granular material can be measured and compared to a known angle of repose for corresponding granular material that meets the desired quality standards for the process. Differences in angle of repose can provide an indication that the granular material is defective or requires additional processing.

Figure 11:
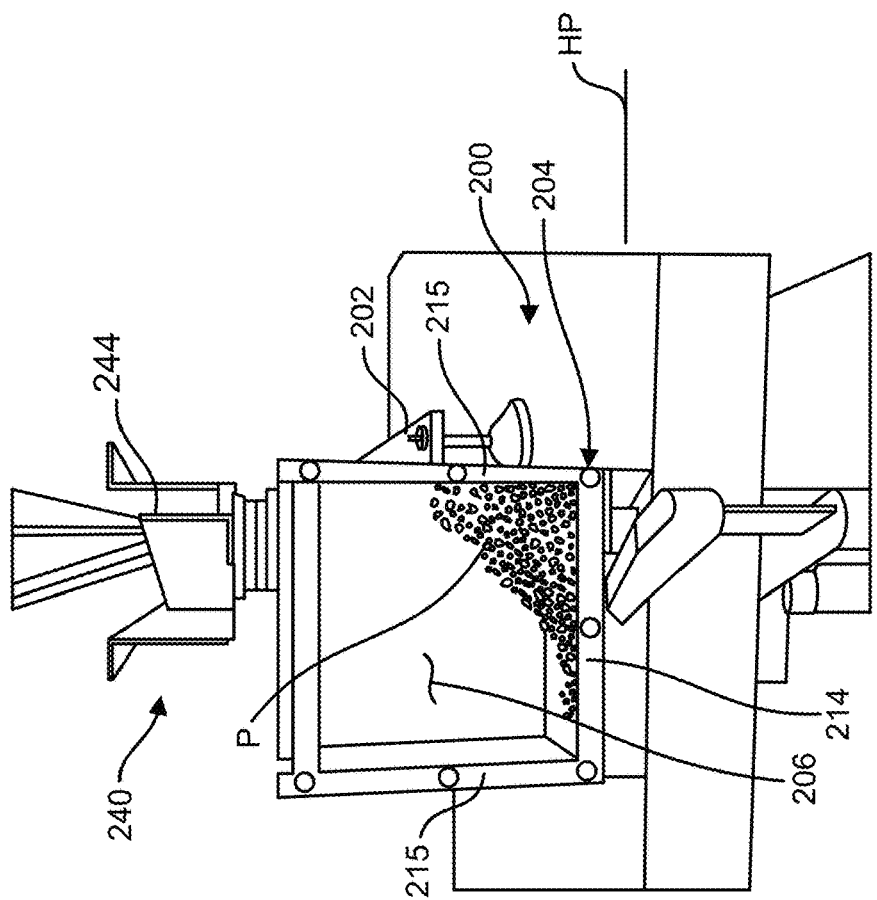
FIG. 11 is a front perspective view of the evaluation system of FIG. 10.
Figure 10:
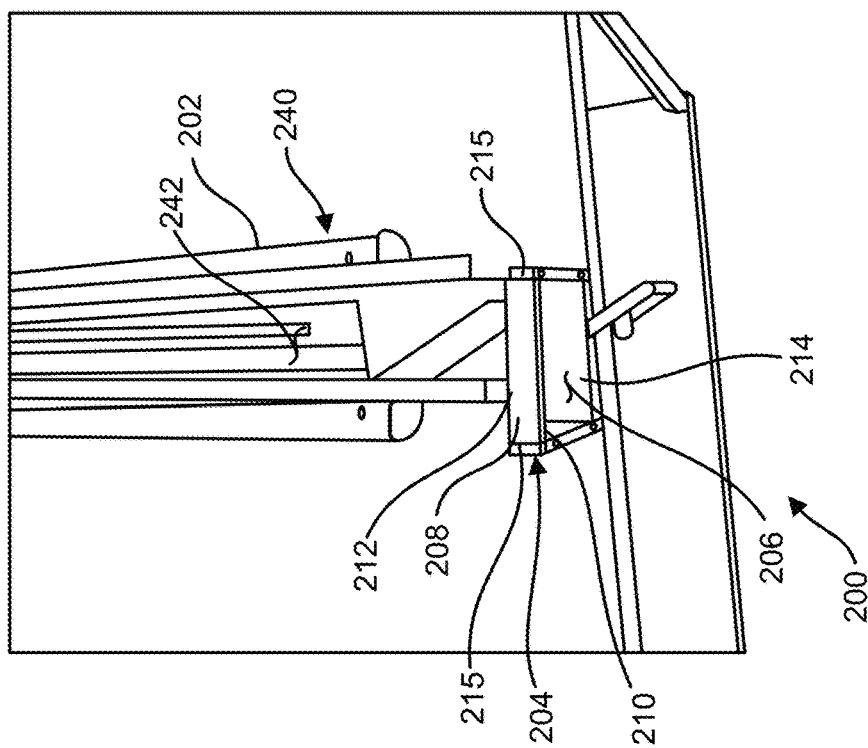
FIG. 10 is a partial top plan view of another embodiment of an evaluation system.

Referring to FIGS. 10 and 11, another embodiment of an evaluation system for determining an angle of repose of granular material is generally indicated at reference number 200. The evaluation system 200 includes a base 202 and a receptacle, generally indicated at 204, which is fixed to the base. The receptacle 204 defines a cavity 206 and a top opening 208 through which the granular material passes into the cavity. In the illustrated embodiment, the cavity 206 is substantially rectangular. The receptacle 204 includes a front wall 210, a rear wall 212, a bottom support wall 214, and first and second side walls 215. The bottom support wall 214 is substantially flat and extends in a fixed, generally horizontal plane HP. A feed system 240 is configured to gradually feed the granular material into the support cavity 206 through opening 208 so that the granular material forms a pile P (FIG. 11) atop the support wall 214. In the illustrated embodiment, the feed system 240 comprises a vibratory feeder (not shown) configured to feed the seeds along a feed channel 242 (FIG. 10) that narrows as it extends toward an outlet 244 (FIG. 11). The outlet 244 is generally aligned with one side region of the cavity so that the granular material forms a pile P in a corner of the cavity and defines a top that, in substantial part, slopes in a single direction.

In use, the feed system 240 gradually feeds the granular material through the outlet 244 and it falls through the opening 208 into the cavity 206. The gradually fed granular material slowly forms a pile P on the support wall 214. A top of the pile P has an angle of inclination that increases until the angle is at about the angle of repose of the granular material. In one embodiment, the evaluation system 200 includes the imaging system 124 (not shown in FIGS. 10 and 11) configured to capture images of the pile P of granular material through the front wall 210 of the receptacle 206 as it grows in size. The imaging system 124 functions in a similar way as described with the first embodiment and the controller can control the flow of material into the cavity 206 based on the calculated angle of repose. In still other embodiments, a technician can monitor the piling of granular material in the receptacle 204 and determine when the top has reached the angle of repose (e.g., by visually determining when the angle of inclination of the top stops increasing). When the technician determines that the top of the pile P has reached the angle of repose, the technician can use an instrument such as a protractor to measure the angle of repose.

Referring to FIGS. 12A-12D, another device for measuring the angle of repose of granular material used in a seed process is generally indicated at reference number 300. The measurement device 300 includes a receptacle 304 that is similar in shape and arrangement to the receptacle 104 of the evaluation system 20 described above. Like the receptacle 104, the receptacle 304 includes a front wall 310, a rear wall 312, and a support wall 314 that define a generally circular cavity 306 having an open top end. The internal surface of the support wall 314 has a rough surface texture. Unlike the receptacle 104, the rear wall 312 of the receptacle 304 is substantially opaque. The measuring device 300 further includes a transparent plate 348 that is pivotably mounted on the front wall. The transparent plate includes a plurality of parallel indicator lines 349 and protractor scale markings 350 along a segment of a perimeter edge margin thereof. The protractor scale markings 350 have a fixed angular position with respect to the indicator lines 349 such that the 0° position on the protractor scale markings is oriented substantially parallel to the indicator lines and the 90° position on the protractor scale markings is oriented substantially perpendicular to the indicator lines. An indicator arm 352 is also pivotably mounted on the front wall 310 of the receptacle 304 to pivot relative to the receptacle independently of the plate 348.

Figure 13:
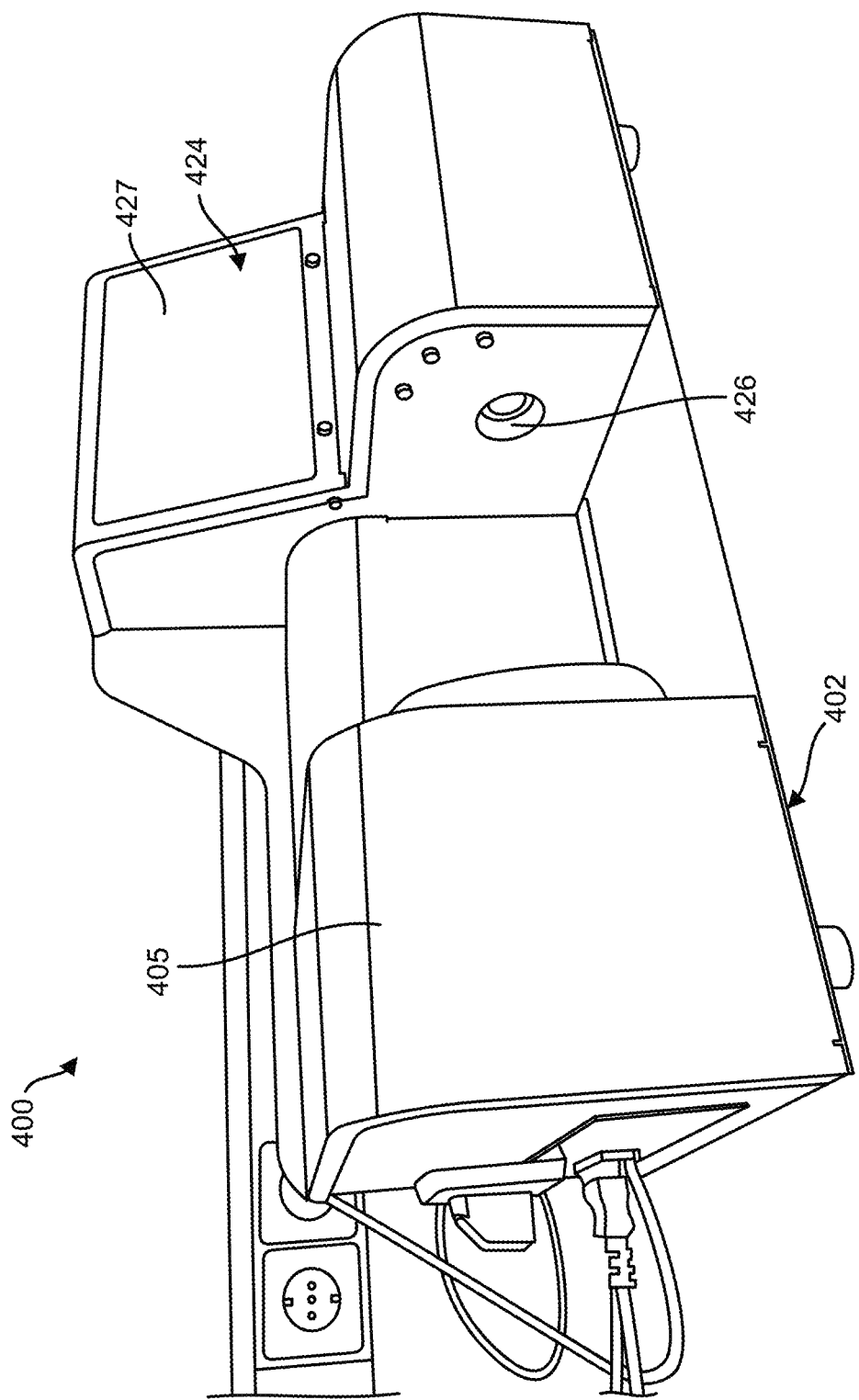
FIG. 13 is a perspective of another embodiment of an evaluation system.
Figure 14:
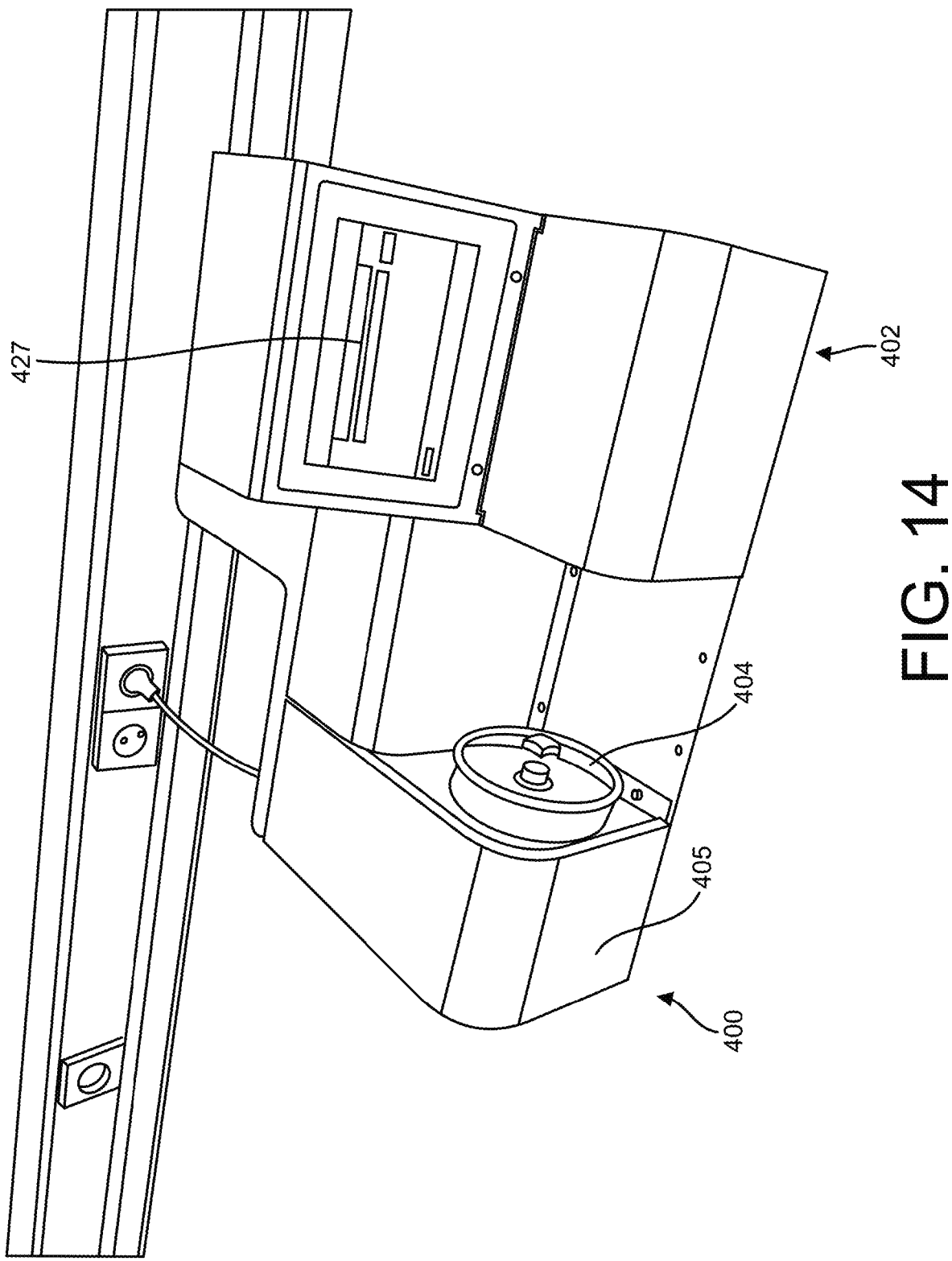
FIG. 14 is another perspective of the evaluation system of FIG. 13.

In use, seeds or other granular material is placed into the receptacle 304 and the receptacle is rolled along a horizontal surface (or other surface of known inclination). As the receptacle 304 rolls, the indicator arm 352 pivots relative to the receptacle to remain in a downwardly oriented position. When the pile of seeds or other granular material in the receptacle 304 begins to slump or slide, the user pivots the plate 348 so that the indicator lines 349 are oriented substantially parallel to the top of the pile. The user then determines an indicated angle to which the downwardly oriented indicator arm 352 is pointing on the protractor scale markings 350. The angle of inclination of the seed pile (or angle of repose when the seed pile has slumped) is calculated as 90° minus the indicated angle. Referring to FIGS. 13 and 14, another embodiment of a system for measuring the angle of repose of granular material such as seeds is generally indicated at reference number 400. The system 400 includes a base 402 and a receptacle 404 (FIG. 14) mounted on the base for rotation with respect to the base about a generally horizontal axis of rotation. The receptacle 404 can have any of the features of the receptacle 104 discussed above. In the illustrated embodiment, the base 402 comprises an enclosure 405 that encloses a driver (not shown) operatively coupled to the receptacle for rotating about a generally horizontal axis of rotation with respect to the base. A controller (not shown) is configured to actuate the driver 120 to synchronize rotation of the receptacle 424 with activation of an imaging system 424 to determine the angle of repose as explained above. As shown in FIG. 13, the illustrated imaging system 424 includes a camera 426 that is mounted on the enclosure 405 opposite the receptacle 404 to capture images and/or video of the receptacle as it rotates. In one or more embodiments, the camera 426 is aimed generally parallel to the axis of rotation of the receptacle 404. In the illustrated embodiment, the imaging system 424 further comprises a display 427 that is configured to display the unprocessed or processed images that are captured by the camera 426. Suitably, user can navigate a user interface displayed on the display 427 to select images to view. In one or more embodiments, the system 400 includes a measurement processor (not shown) configured to automatically determine the angle of repose of granular material in the receptacle 404 in accordance with any of the methods discussed above. The user can view the determined angle of repose on the display in one or more embodiments.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

The invention claimed is:

1. A method of processing seeds, the method comprising:
 (a) processing seeds in a processing step;
 (b) determining an angle of repose of at least a portion of the processing seeds; and
 (c) determining whether the processing seeds have been sufficiently processed in the processing step based on the determined angle of repose,
 wherein step (b) comprises forming a pile of the at least a portion of the processed seeds in a receptacle,
 wherein step (b) further comprises rotating the receptacle about a generally horizontal axis to a plurality of positions that are angularly offset about the generally horizontal axis to cause a top of the pile to become inclined,
 wherein said processing the seeds comprises at least one of pelletizing, coating, drying, polishing, and delinting,
 the method further comprising one of step (d) singulating the processed seeds if the processed seeds are determined to be sufficiently processed in step (c), or step (e) repeating steps (a)-(c) if the processed seeds are determined to be not sufficiently processed in step (c).

2. A method as set forth in claim 1, wherein step (b) further comprises capturing an image representative of at least a segment of the top of the pile at each of the plurality of positions of the receptacle.

3. A method as set forth in claim 2, wherein step (b) further comprises fitting a line to an indication of the top of the pile in the image for each of the plurality of positions of the receptacle and determining an angle of each fitted line with respect to a common reference axis.

4. A method as set forth in claim 3, wherein step (b) further comprises determining at which of the plurality of positions of the receptacle the determined angle of the pile generally corresponds with the angle of repose of the polished seeds.

5. A method as set forth in claim 4, wherein step (b) further comprises averaging the determined angles for each of the positions at which the angle of the pile was determined to generally correspond with the angle of repose of the polished seeds.

6. A method as set forth in claim 1, wherein step (b) comprises, after the at least a portion of the polished seeds is placed in the receptacle:
 rotating the receptacle about a generally horizontal axis of rotation in a first rotational direction to a first set of positions that are angularly offset about the axis of rotation;

determining an angle of inclination of the pile at each of the first set of positions;

determining a first measurement of the angle of repose of the polished seeds based on the determined angle of inclination of the pile;

rotating the receptacle about the axis of rotation in a second rotational direction opposite the first rotational direction to a second set of positions that are angularly offset about the axis of rotation;

determining an angle of inclination of the pile at each of the second set of positions;

determining a second measurement of the angle of repose of the polished seeds based on the determined angle of inclination of the pile at at least one of the second set of positions; and averaging the first and second measurements of the angle of repose to result in a final angle of repose.

7. A system for determining an angle of repose of processed seeds, the system comprising:

a receptacle defining a cavity and an opening in communication with the cavity for receiving the processed seeds therethrough, the receptacle having a support wall configured for supporting the processed seeds in the cavity in a pile, wherein the support surface of the receptacle is substantially curved;

an image sensor facing the receptacle and configured to capture an image of the pile of processed seeds received in the cavity; and an image processor operatively connected to the image sensor to receive the captured image from the image sensor, the image processor being configured to evaluate the image to determine an angle of inclination of the pile based on the image, a controller operatively connected to the image sensor and the driver, the controller being configured to control the driver to rotate the receptacle to a plurality of positions that are angularly spaced apart about the axis of rotation and to control the image sensor to capture an image at each of the plurality of positions, wherein the controller is configured to control the driver to rotate the receptacle in a first direction to a first set of positions that are angularly spaced apart about the axis and to rotate the receptacle in a second direction opposite the first direction to a second set of positions that are angularly spaced apart about the axis.

8. A system as set forth in claim 7, wherein the support surface has a generally circular arc shape.

9. A system as set forth in claim 7, further comprising a driver configured to rotate the receptacle about a generally horizontal axis of rotation.

10. A system as set forth in claim 7, wherein the image processor is configured to fit a line to an indication of a top of the pile in each image and to determine an angle of each fitted line with respect to a common reference axis.

11. A system as set forth in claim 7, wherein the image processor is configured to evaluate only a portion of the image corresponding with a region of interest of the cavity that is smaller than the entire cavity as represented in the image.

12. A system as set forth in claim 7, wherein the receptacle comprises a front wall facing the image sensor, the front wall being at least somewhat transparent.

13. A system as set forth in claim 12, further comprising a light source configured to illuminate the pile of granular material received in the sampling material.

14. A measurement device for measuring an angle of repose of granular material, the measurement device comprising:

a receptacle comprising a front wall, a rear wall, and a support wall extending between the front and rear walls, the receptacle having an interior between the front and rear walls, the receptacle being configured to receive granular material in the interior such that the granular material is supported on the support wall, the front wall of the receptacle being at least somewhat transparent;

a plate pivotably mounted on the front wall for rotation about an axis with respect to the receptacle through a range of motion, the plate overlapping at least a portion of the front wall along at least a portion of the range of motion, the plate being at least somewhat transparent such that the interior of the receptacle is visible through the plate and the front wall when the plate overlaps the front wall, the plate having a perimeter edge margin and protractor scale markings spaced apart along at least a segment of the perimeter edge margin, the plate further comprising at least one indicator line; and an indicator arm pivotably mounted on the front wall for rotation about the axis with respect to the receptacle independently of the plate, the indicator arm extending radially outward from the axis.

15. A method of measuring an angle of repose of granular material using the measurement device of claim 14, the method comprising:

receiving the granular material in the interior of the receptacle as a pile supported on the support wall;

rotating the receptacle about the axis until the pile begins to slump;

rotating the plate about the axis with respect to the receptacle to orient the indicator line generally parallel to a top of the pile; and supporting the indicator arm such that the indicator arm extends vertically downward from the axis.

16. A method as set forth in claim 1, wherein steps (a), (b), and (c) are automated along a single inline process.

17. A method as set forth in claim 1, wherein steps (a), (b), (c), (d), and (e) are automated along a single inline process.

18. A method as set forth in claim 1, comprising performing step (d) after step (c).

19. A method as set forth in claim 1, comprising performing step (e) after in step (c).

20. A method as set forth in claim 18, further comprising sorting the polished seeds after step d.

* * * * *